US 6,731,783 B2

(12) United States Patent
Tsujii

(10) Patent No.: US 6,731,783 B2
(45) Date of Patent: May 4, 2004

(54) IMAGE PROCESSING APPARATUS AND METHOD

(75) Inventor: Osamu Tsujii, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/227,924

(22) Filed: Jan. 8, 1999

(65) Prior Publication Data

US 2002/0012450 A1 Jan. 31, 2002

(30) Foreign Application Priority Data

Jan. 9, 1998 (JP) .......................... 10-014967

(51) Int. Cl.$^7$ .............................. G06K 9/20; A61B 6/00; G01N 23/04; G01N 23/083
(52) U.S. Cl. .................. 382/132; 382/282; 250/582; 378/146
(58) Field of Search ................. 382/132, 282, 382/283; 358/213; 250/370, 582; 348/716; 345/127; 353/101; 378/146

(56) References Cited

U.S. PATENT DOCUMENTS

| 4,246,607 A | * | 1/1981 | Vijverberg ................ 378/98.5 |
| 4,472,826 A | * | 9/1984 | van de Ven ............... 378/98.3 |
| 4,809,309 A | * | 2/1989 | Beekmans ................ 378/98.7 |
| 4,907,252 A | * | 3/1990 | Aichinger et al. ......... 378/98.5 |
| 4,969,174 A | * | 11/1990 | Scheid et al. .............. 378/146 |
| 5,150,292 A | * | 9/1992 | Hoffmann et al. .......... 600/431 |
| 5,187,584 A | | 2/1993 | Nishiki et al. ............ 358/213.18 |
| 5,278,887 A | * | 1/1994 | Chiu et al. ................ 378/156 |
| 5,282,254 A | * | 1/1994 | Chiu et al. ................ 382/132 |
| 5,365,076 A | * | 11/1994 | Itakura ..................... 250/582 |
| 5,369,678 A | * | 11/1994 | Chiu et al. ................. 378/62 |
| 5,434,632 A | * | 7/1995 | Carmichael ................ 353/101 |
| 5,485,500 A | * | 1/1996 | Baba et al. ............... 378/98.2 |
| 5,530,935 A | * | 6/1996 | Dillen ...................... 378/98.2 |
| 5,539,798 A | * | 7/1996 | Asahina et al. .......... 378/98.5 |
| 5,572,037 A | * | 11/1996 | Liu et al. ................ 250/483.1 |
| 5,585,638 A | * | 12/1996 | Hoffman ................... 250/370 |
| 5,590,170 A | * | 12/1996 | Zweig ........................ 378/63 |
| 5,592,237 A | | 1/1997 | Greenway et al. .......... 348/716 |
| 5,710,801 A | * | 1/1998 | Dillen et al. .............. 378/98.7 |
| 6,049,636 A | * | 4/2000 | Yang ......................... 382/289 |
| 6,088,424 A | * | 7/2000 | Postlethwaite et al. ....... 378/63 |
| 6,124,841 A | * | 9/2000 | Aoyama .................... 345/127 |

FOREIGN PATENT DOCUMENTS

| DE | 195 24 858 | | 1/1997 | |
| EP | 0 767 389 | | 4/1997 | |
| GB | 0767389 A | * | 2/1996 | ............. G01T/1/29 |

OTHER PUBLICATIONS

CCD Mosaic Technique for Large Field Digital Mammography, by Antony jalink, IEEE, all Pages.*
CCD Mosaic Technique for Large Field Digital Mammography, by Antony jalink, IEEE, all Pages, 1996.*
Jalink, Antony, et al., "CCD Mosaic Technique for Large–Field Digital Mammography", IEEE Transactions on Medical Imaging, vol. 15, No. 3, pp. 260–267 (Jun. 1996).

* cited by examiner

Primary Examiner—Bhavesh M. Mehta
Assistant Examiner—Christopher Sukhaphadhana
(74) Attorney, Agent, or Firm—Fitzpatrick, Cella, Harper & Scinto

(57) ABSTRACT

An X-ray beam transmitted through an object is transmitted through a grid, which has been moved to the X-ray irradiation position, and reaches a panel sensor after scattered X-rays are removed by the grid. Image processing is done on the basis of a reduced image input from the panel sensor. As the reduced image, an image reduced to ⅛ the image output from the panel sensor in both the vertical and horizontal directions is used, and the image is binarized by a predetermined threshold value. Noise of the binary image is removed by an opening filter, and lines of the noise-removed image are scanned in the x- and y-directions to form a list of scan start and end points. The average values of these points are calculated to determine an irradiated region. By extracting an image of the irradiated region from the panel sensor, fluoroscopic image observation and still image photographing are efficiently done using a panel sensor with a large photographing frame.

13 Claims, 7 Drawing Sheets

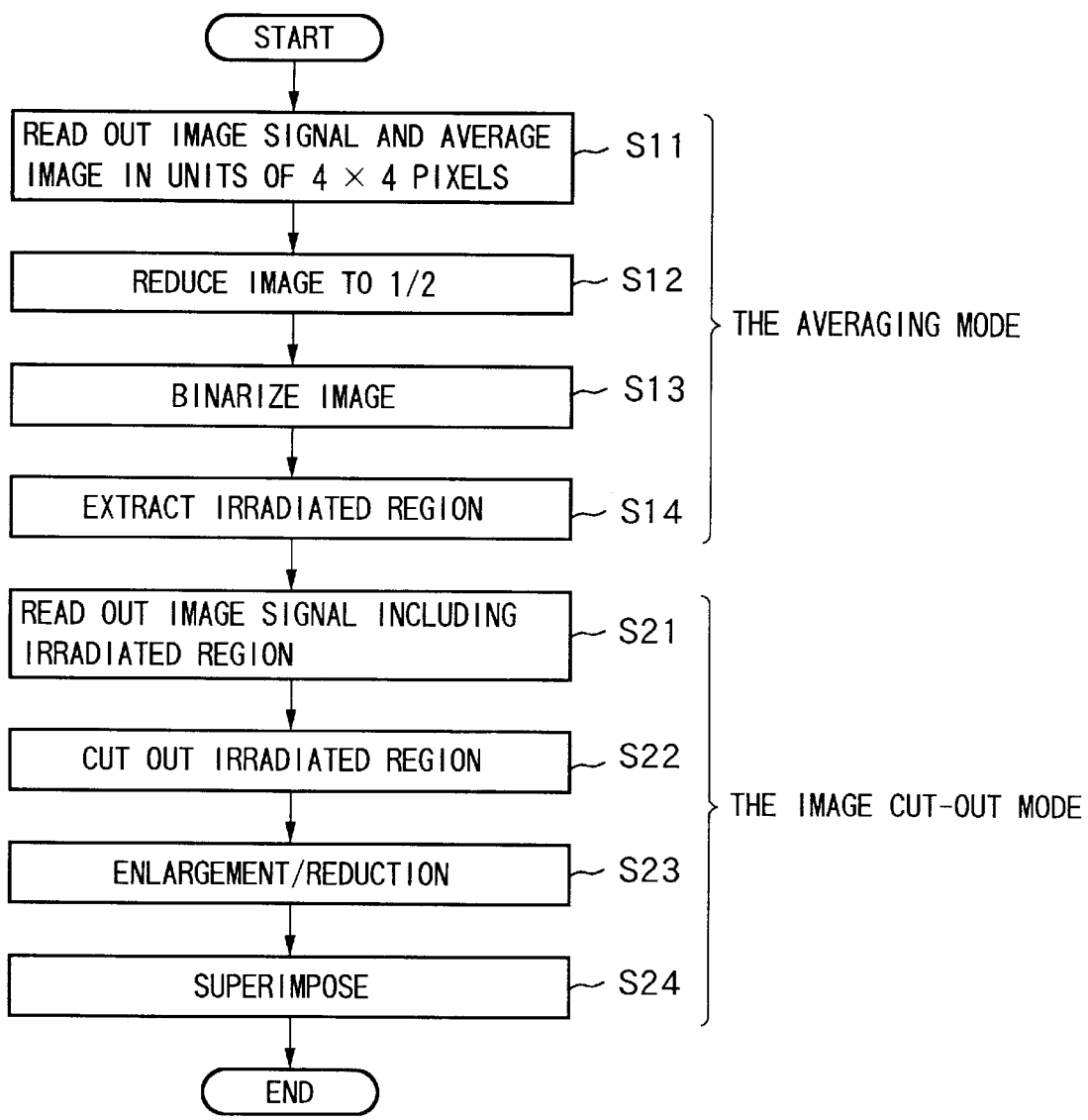

IMAGE PROCESSING APPARATUS AND METHOD

BACKGROUND OF THE INVENTION

The present invention relates to an image processing apparatus and method and, more particularly, to a radiography apparatus which photographs a high-resolution still image while observing an X-ray fluoroscopic image.

Conventionally, as a sensor for a system for taking a still X-ray image while observing an X-ray fluoroscopic image, a combination of an X-ray image intensifier and an indirect photographing unit such as a spot camera, rapid sequence camera, or the like, or an X-ray image intensifier and direct photographing cassette are used.

However, in the above-mentioned prior art, although the X-ray image intensifier has high sensitivity, its sensor portion has a large dimension in the X-ray fluoroscopy direction, and it is hard to apply it to a large screen. If the sensor portion is made large in size, the image intensifier becomes heavy. With the recent advance of the semiconductor technology, it has become possible to manufacture high-sensitivity, large-screen, lightweight, and low-profile sensors, while the use of the X-ray image intensifier is limited in the following respects:

(1) When the photographing screen is small, the X-ray image intensifier must move in correspondence with the x- and y-movements of an X-ray source. On the other hand, when the photographing screen size is increased, a long time is required to capture images in units of frames, and it is difficult to quickly capture images like a moving image.

(2) During fluoroscopy, the operator must keep close watch on both the interior of the photographing chamber and the fluoroscopy monitor.

SUMMARY OF THE INVENTION

It is an object of the present invention to provide an image processing apparatus and method which can solve the aforementioned problems, and allow efficient observation of fluoroscopic images.

It is another object of the present invention to increase the frame rate of moving image display by extracting and displaying a region irradiated with radiation from an image on a two-dimensional sensor.

It is still another object of the present invention to allow parallel capturing of images from a plurality of regions on a two-dimensional sensor, and to achieve a high frame rate of moving image display by dividing the irradiated region by these plurality of regions to improve image data capture speed.

It is still another object of the present invention to insert and display the irradiated region into a corresponding position of a normal visible image so as to improve operability.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a flow chart showing the video fluoroscopy process of the first embodiment.

DETAILED DESCRIPTION OF THE PREFERRED EMBODIMENTS

Preferred embodiments of the present invention will now be described in detail in accordance with the accompanying drawings.

Figure 1:
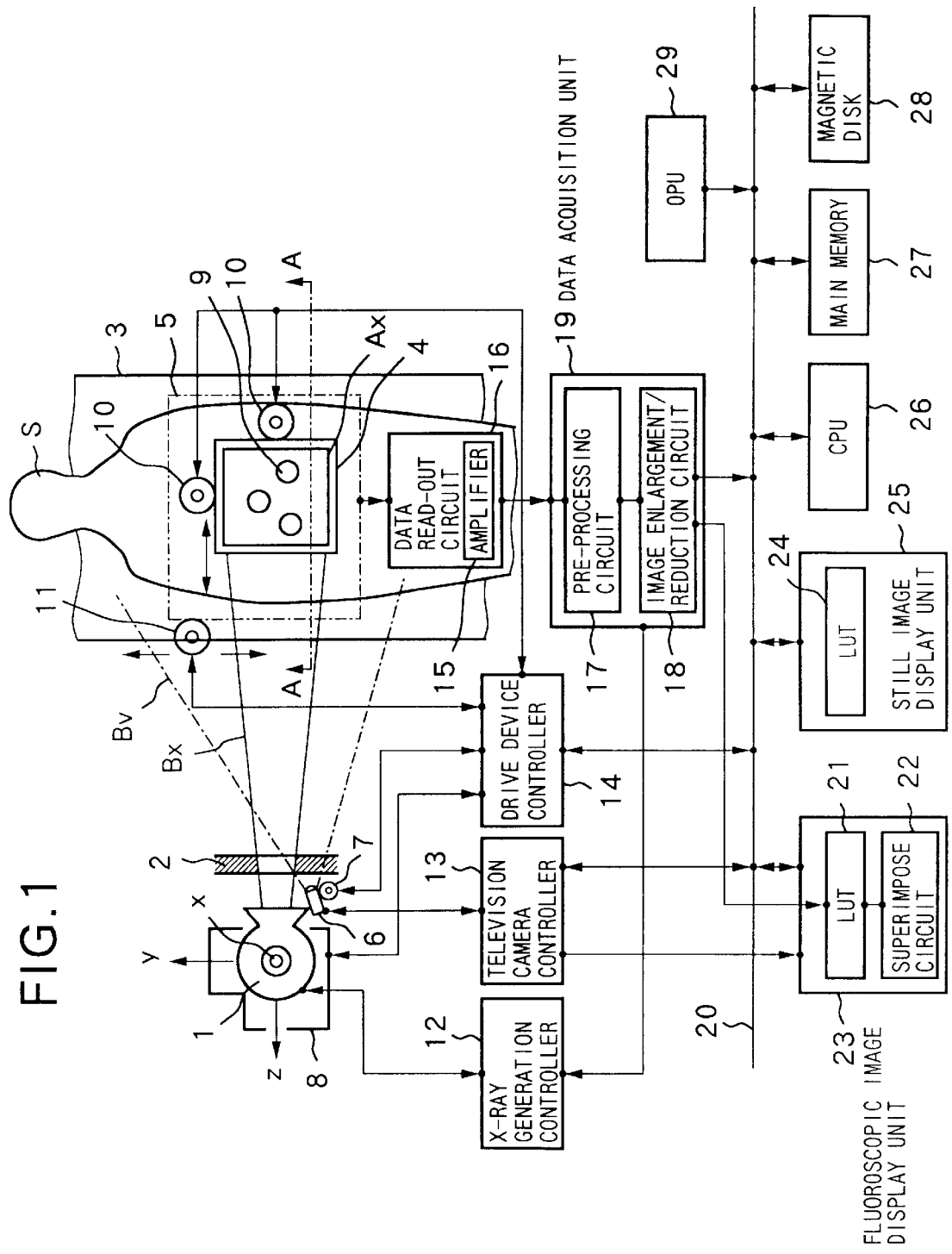
FIG. 1 is a schematic diagram showing the arrangement according to the first embodiment of the present invention.
Figure 2:
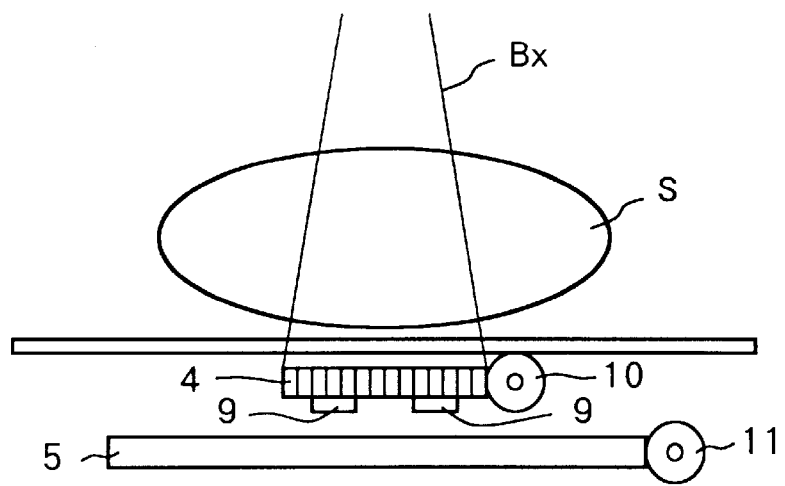
FIG. 2 is a sectional view taken along a line A—A in FIG. 1.

FIG. 1 is a schematic diagram showing the arrangement of the first embodiment, and FIG. 2 is a sectional view taken along a line A—A in FIG. 1. A two-dimensional stop 2 having a rectangular aperture is placed in front of an X-ray tube 1 that emits X-rays, and an object S such as a human body or the like, a fluoroscopy bed 3 on which the object S is placed, a grid 4 which is movable to an X-ray irradiation position, and a panel sensor 5 for receiving X-rays from which scattered light is removed by the grid 4, are placed in front of the stop 2. A visible light television camera 6 is located in the vicinity of the X-ray tube 1, and is coupled to a camera angle drive device 7 for varying its camera angle. The X-ray tube 1 is connected to an X-ray tube xyz-drive device 8.

Three phototimers 9 are adhered to the back surface of the grid 4, which is coupled to a two-dimensionally movable grid xy-drive device 10. The panel sensor 5 is coupled to a linearly movable panel sensor y-drive device 11. An X-ray generation controller 12 is connected to the X-ray tube 1, and a television camera controller 13 is connected to the visible light television camera 6. Also, a drive device controller 14 is connected to the camera angle xyz-drive device 7, grid xy-drive device 10, and panel sensor y-drive device 11.

The panel sensor 5 is connected in turn to a data read-out circuit 16 which incorporates an amplifier 15, and a data acquisition unit 19 which incorporates a pre-processing circuit 17 and image enlargement/reduction circuit 18. The data acquisition unit 19 is connected to the X-ray generation controller 12 and a bus line (system bus) 20. A fluoroscopic image display unit 23 having a look-up table 21, superimpose circuit 22, and the like, and a still image display unit 25 having a look-up table 24 are connected to the bus line 20. The image enlargement/reduction circuit 18 of the data acquisition unit 19 is directly connected to the look-up table 21 in the fluoroscopic image display unit 23, and the television camera controller 13 is connected to the fluoroscopic image display unit 23 and bus line 20.

The drive device controller 14, the data acquisition unit 19, a CPU 26, a main memory 27, a magnetic disk 28, and an operation unit (OPU) 29 are connected to each other via the bus line 20.

Upon taking a fluoroscopic image with the above-mentioned arrangement, an X-ray beam Bx emitted by the X-ray tube 1 is shaped into a rectangular shape by the two-dimensional stop 2, and becomes incident on that region of the object S, which is to be photographed. As shown in FIG. 2, the X-ray beam Bx transmitted through the object S is transmitted through the grid 4 which has reached the X-ray irradiated position, and then reaches the panel sensor 5 after scattered X-rays are removed by the grid 4.

The panel sensor 5 converts the X-ray beam Bx into a charge amount, and the data read-out circuit reads the charge amount with a required data size and resolution. The readout data is subjected to pre-processing such as offset processing, gain correction, defective pixel correction, and the like in the pre-processing circuit 17, and is cut out and enlarged/reduced to the display image size in the image enlargement/reduction circuit 18.

Since the data read-out circuit 16 can cut out an image in the up-and-down direction, i.e., y-direction accurately but roughly in the right-and-left direction, i.e., x-direction, the image enlargement/reduction circuit 18 finally accurately cuts out an X-ray irradiated region in both the up-and-down and right-and-left directions, and outputs the enlarged/reduced image. This image is directly transferred to the fluoroscopic image display unit 23 without the intervention of the system bus 20, and is subjected to density-gradation conversion via the fluoroscopic image look-up table 21. The converted image is superimpose-displayed via the superimpose circuit 22 at that position of a visible light image which corresponds to the X-ray irradiated region.

Figure 3:
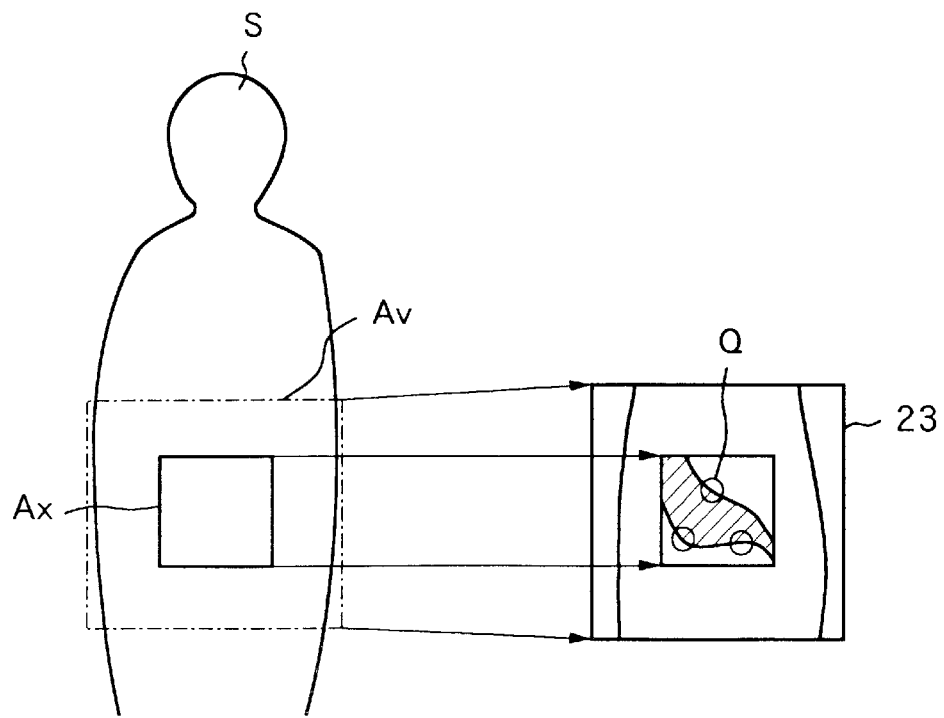
FIG. 3 is an explanatory view of fluoroscopic image display.

The object S is illuminated by a light beam Bv coming from the visible light television camera 6. The visible light image is captured by the visible light television camera 6, which is controlled by the television camera controller 13. The captured visible light image is displayed on the fluoroscopic image display unit 23 as an analog signal. FIG. 3 shows the superimposed display at that time. Only a region Ax irradiated with X-rays is displayed inside a visible light image region Av on the fluoroscopic image display unit 23.

Figure 4:
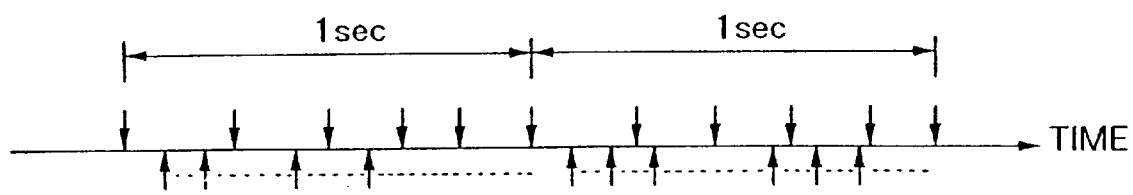
FIG. 4 is a timing chart of fluoroscopic image capturing.

Upon image tracking in video fluoroscopy, the X-ray irradiated region Ax on the panel sensor 5 can be calculated on the basis of the information of the position of the X-ray tube xyz-drive device 8 in the x-, y-, and z-directions, and the aperture area of the two-dimensional stop 2 for the X-ray beam Bx. However, in this embodiment, the irradiated region Ax is tracked by image processing. The data read-out circuit 16 has a cut-out mode for reading only partial data of the panel sensor 5 and an averaging mode for outputting the average pixel of 4×4 pixels for the entire panel sensor 5, so as to increase the frame rate as the number of frames displayed per sec. In video fluoroscopy, data is captured while switching the cut-out mode and averaging mode, as shown in FIG. 4. Referring to FIG. 4, the upward arrow T indicates the cut-out mode, which cuts out and reads data from an X-ray irradiated portion at 25 frames/sec. The downward arrow ↓ indicates the averaging mode, which averages and captures an image on the entire panel sensor 5 at 5 frames/sec.

FIG. 12 is a flow chart for explaining the processing in fluoroscopic image display according to this embodiment. Referring to FIG. 12, steps S11 to S14 show the processing in the averaging mode, and steps S21 to S24 show that in the cut-out mode. The processing in each mode is executed for approximately 1/30 sec, the averaging mode is executed five times per sec, and the cut-out mode is executed 25 times per sec. That is, after the averaging mode is executed once, the cut-out mode repeats itself five times.

In the averaging mode, the data read-out circuit 16 reads out image data from the panel sensor 5, averages the readout data in units of 4×4 pixels, and outputs the average data (step S11). In step S12, image data output from the data read-out circuit 16 is reduced to ½ in the x- and y-directions by the image enlargement/reduction circuit 18. As a consequence, the image data output from the panel sensor 5 is reduced to ⅛ in the x- and y-directions. The reduced image is binarized in step S13, and a region irradiated with radiation, i.e., the irradiated region, is specified in step S14.

On the other hand, in the cut-out mode, the image of the irradiated region specified in the averaging mode (step S14) is acquired from the panel sensor 5 in steps S21 and S22. Since the data read-out circuit 16 of this embodiment cannot cut out an image in the x-direction, but the image enlargement/reduction circuit 18 can cut it out, the acquisition process is divided into two steps S21 and S22. In step S23, the image of the irradiated region is enlarged/reduced. This is to take balance between the two image sizes so as to insert and display the image of the irradiated region on a visible image captured by the television camera 6. In step S24, the fluoroscopic image display unit 23 superimposes and displays the enlarged/reduced image of the irradiated region into the visible image using the superimpose circuit 22.

Figure 5:
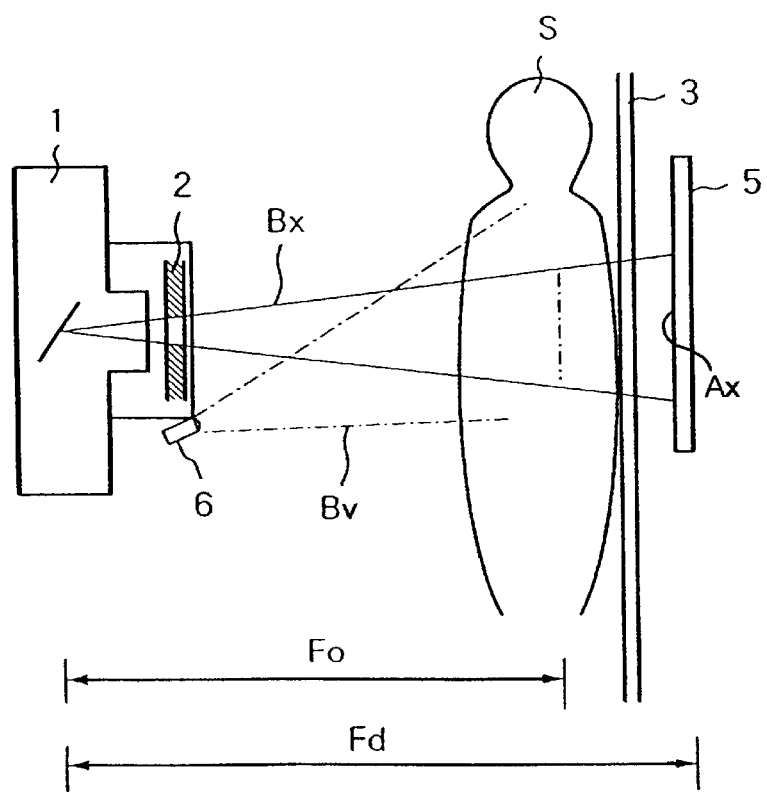
FIG. 5 is an explanatory view of the relationship between the field of view of a visible light television camera and X-ray irradiated region.
Figure 6:
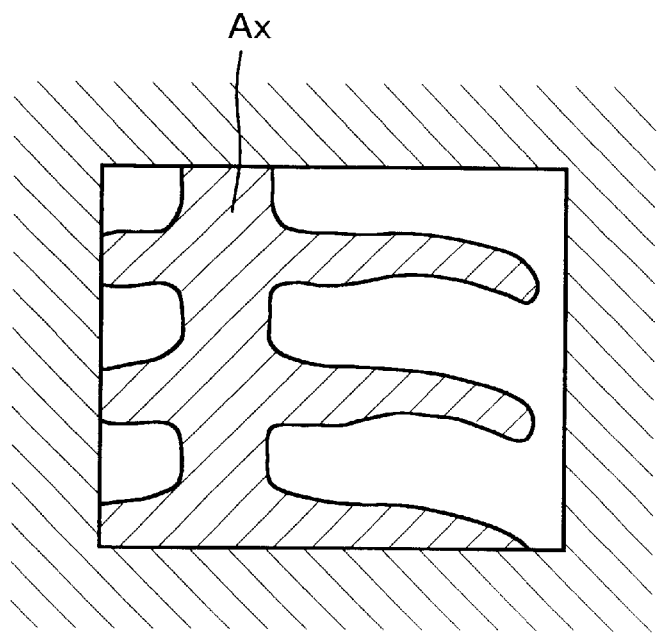
FIG. 6 is an explanatory view of irradiated region extraction.
Figure 7:
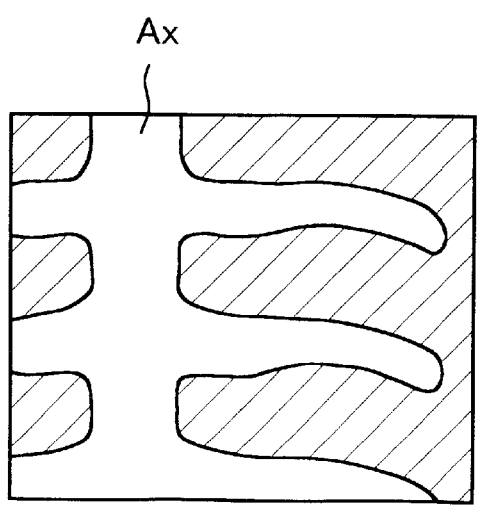
FIG. 7 is an explanatory view of irradiated region extraction.
Figure 8:
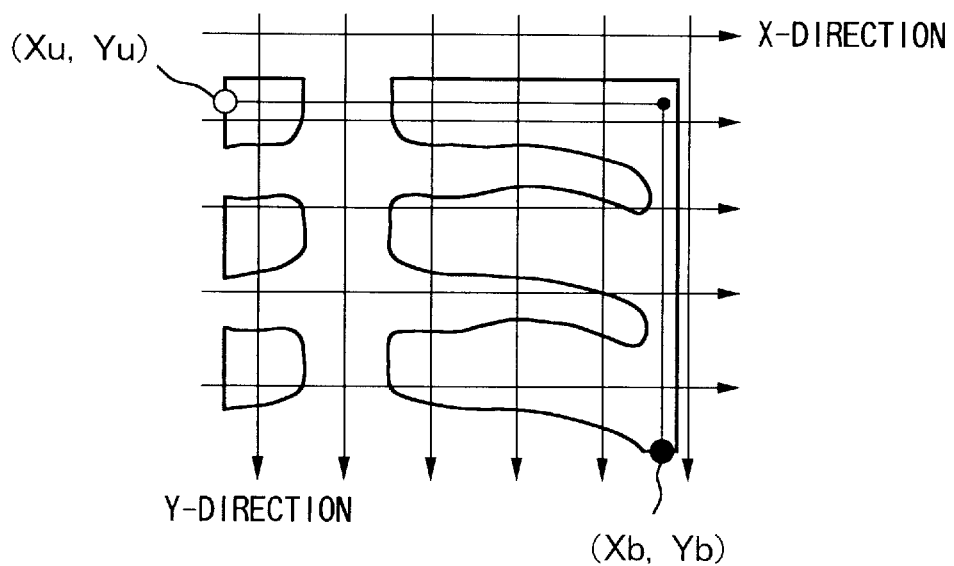
FIG. 8 is an explanatory view of irradiated region extraction.

FIG. 5 shows the relationship between the visible light television camera 6 and X-ray irradiated region Ax. In FIG. 5, Fo represents the distance from the X-ray focal point to the body axis of the object S, and Fd represents the distance from the X-ray focal point to the panel sensor 5. FIGS. 6 to 8 show the extraction process of the X-ray irradiated region Ax in the panel sensor 5. FIG. 6 shows a gray image, in which a dark dot portion indicates a region which is not irradiated with X-rays, and a light dot portion indicates a region where X-rays are absorbed more in the X-ray irradiated region Ax. FIG. 7 shows a binary image, i.e., the irradiated region Ax after binarization. FIG. 8 shows the extraction process of the irradiated region Ax in the x- and y-directions, i.e., shows the upper left and lower right coordinate positions (Xu, Yu) and (Xb, Yb) of the irradiated region Ax, and the start point (open circle) and end point (closed circle) of irradiated region extraction in the x-direction.

The operation in the averaging mode will be explained first.

In this embodiment, since the number of pixels on the entire panel sensor 5 is 2,688×2,688 pixels, the number of output pixels in the 4×4 pixel averaging mode is 672×672 pixels. Also, since clock pulses for A/D conversion are generated at 33 MHz, the data read-out time is 13.5 msec if one A/D converter is used. The irradiated region Ax can be extracted from the 672×672 pixels of the averaged output image by image processing. However, in this embodiment, since the CPU 26 executes irradiated region extraction, the averaged image is further reduced to ½ in both the x- and y-directions via the image enlargement/reduction circuit 18 to obtain 336 pixels×336 pixels.

Since the image enlargement/reduction circuit 18 is also driven at 33 MHz as in the capture clock pulses, and data flows in from the pre-processing circuit 17 via a pipeline, enlargement/reduction can be completed simultaneously with the end of the capture time of about 13.5 msec. The reduced, averaged 336×336 image is transferred to the main memory 27 via the system bus 20. The transfer time at that time is around 3 msec since the system bus 20 used has a burst rate of 40 MB/sec.

The irradiated region extraction includes, binarization and coordinate extraction. The pre-processing circuit 17 (shown in FIG. 1) binarizes pixel values as dose values at a predetermined threshold value Vr, as shown in FIG. 7. After binarization, to remove noise, the binary data undergoes opening which is one type of morphological filtering. Then, using the fact that the irradiated region Ax has a rectangular shape, as shown in FIG. 8, x- and y-lines are scanned to form a list of scanning start and end points, and the irradiated region Ax is set by the average value of these points.

The output of the irradiated region extraction is indicated by the upper left and lower right coordinate positions (Xu, Yu) and (Xb, Yb) of the rectangular irradiated region shown in FIG. 8, and the processing comes to an end within around 33 msec from the beginning of capture. The processing result is set in turn in the data read-out circuit 16, pre-processing circuit 17, and image enlargement/reduction circuit 18 via the system bus 20, and the image cut-out mode is executed under this setup.

In the data read-out circuit 16, data is read out from the panel to include an irradiated field rectangle bounded by (Xu, Yu) and (Xb, Yb) set in the circuit. More specifically, data (1, Yu) and (2688, Yb) are read out due to a limitation of this embodiment. This limitation is imposed since the circuit arrangement of this embodiment sequentially multiplexes data in the horizontal direction. Hence, the circuit arrangement may be modified to efficiently read out data to include (Xu, Yu) and (Xb, Yb). The pre-processing circuit 17 prepares offset, gain, and defective correction data in consideration of input pixel data corresponding to only the readout region of the read-out circuit 16, and uses them in pre-processing. Image cut-out processing done by the enlargement/reduction circuit 18 accurately cuts out an irradiated rectangle defined by (Xu, Yu) and (Xb, Yb) from that output from the pre-processing circuit 17, and enlarges/reduces the cut-out result.

As described above, in this embodiment, the averaging mode is executed once per six frames, and the image cut-out mode for an identical position is done in the remaining five frames. The ratio of the averaging mode is programmable. In general, since the movement of the irradiated region Ax on the panel sensor 5 is very slow, 5 frames/sec or more are rarely required. The image obtained in the averaging mode is not displayed by the fluoroscopic image display unit 23, but is used for irradiated region extraction.

The image cut-out mode will be explained below. Even when the rectangular irradiated region defined by (Xu, Yu) and (Xb, Yb) is set as described above, this embodiment cannot read out data between Xu and Xb in the x-direction due to the design of the panel sensor 5. Hence, the data read-out circuit 16 reads out the first to 2688th pixels in the x-direction. The enlargement/reduction circuit 18 accurately cuts out an image in the x-direction, and enlarges/reduces the image as follows. Since the number of pixels to be displayed on the fluoroscopic image display unit 23 is limited to, e.g., 1,280×1,024 pixels, if Md×Nd represents the number of pixels displayed on the fluoroscopic image display unit 23 in the x- and y-directions, the number of pixels of a fluoroscopic image in the x- and y-directions is limited to Ms×Ns for Ms≦Md and Ns≦Nd, although the number of pixels varies depending on the ratio between the visible light irradiated region Av and X-ray irradiated region Ax.

The image to be superimposed is the one nearly on the body axis, as indicated by the broken line in FIG. 5, and its size is reduced to Fo/Fd that of the image on the panel sensor 5. The final enlargement/reduction factor is determined from the number of pixels (Xb−Xu)×(Yb−Yu) of the input image, and the image to be superimposed is displayed so that the ratio Ms/Ns nearly equals (Xb−)/(Yb−Yu). In this process, the enlargement/reduction ratio R is given by:

$$R=(Ms\cdot Fo/Fd)/(Xb-Xu)=(Ns\cdot Fo/Fd)/(Yb-Yu)$$

Note that Fd is calculated from the value of a z-encoder in the X-ray tube xyz-drive device 8, and Fo is calculated by subtracting a predetermined approximate distance from the panel sensor 5 to the body axis from Fd.

The y-movement of the panel sensor 5 in the cut-out mode will be explained below. For example, when Yb−Yu=1,024 pixels, since the number of pixels read out by the data read-out circuit 16 is 2,688×1,024, and A/D conversion is done at 33 MHz, around 80 msec are required if one A/D converter is used. This time can only set a frame rate as low as 12.5 frames/sec, resulting in an intermittently moving image. For this reason, in this embodiment, A/D conversion is multiplexed, i.e., the panel sensor 5 is divided into upper and lower fields, and two A/D converters each for reading out 1,344 (vertical)×2,688 (horizontal) pixels are provided. In this case, assuming that the irradiated region Ax having Yb−Yu=1,024 pixels is evenly located on the panel sensor 5 which is divided into upper and lower fields, the read-out time is 2,688×512 lines/33 MHz=40 msec to obtain a frame rate of 25 frames/sec, thus making the motion of the moving image more natural. On the other hand, if the irradiated region Ax is present on either the upper or lower field of the sensor alone, the frame rate is the same as that obtained by one A/D converter, and is not improved.

Figure 9:
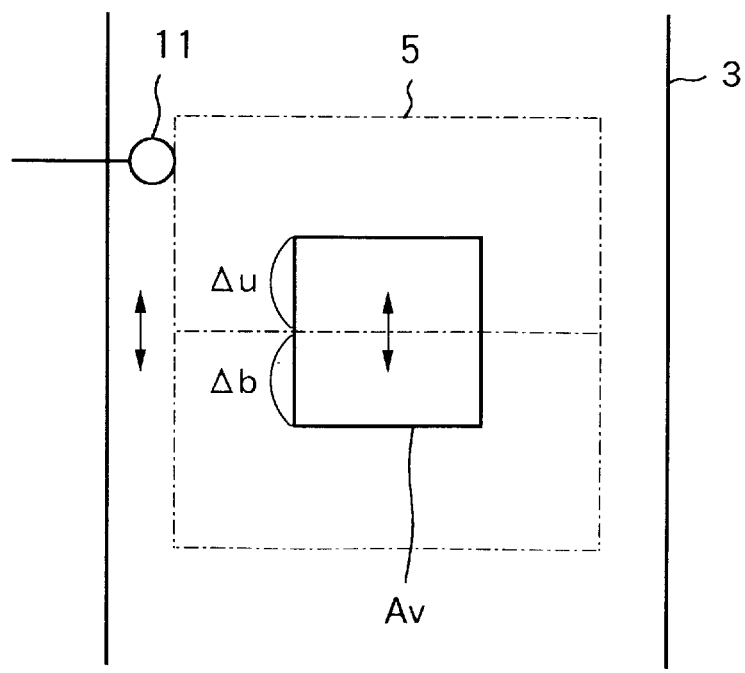
FIG. 9 is an explanatory view of angle setups of the visible light television camera.

In order to evenly divide the irradiated region Ax on the panel sensor 5 into upper and lower fields, the line that divides the panel sensor 5 into the upper and lower fields is set at 1,344 to calculate Δu=1,344−Yu and Δb=Yb−1,344, and the panel sensor 5 is driven until Δu=Δb using the panel sensor y-drive device 11. More specifically, as shown in FIG. 9, if the upper direction is defined as a plus direction and the sensor pitch is 160 μm, the panel sensor 5 is moved by Δd={(Δb−Δu)/2}×160 μm={(Yb+Yu)/2−1344}×160 μm. Note that this calculation is made in the averaging mode alone, and the movement is completed before the next cut-out image. If the movement is not completed before the next cut-out image, a motion artifact is produced in the cut-out image.

The grid 4 is used to remove scattered X-rays in fluoroscopy. When the grid 4 has a structure with an optical focal point, it is moved so that the focal point of the grid 4 agrees with that of the X-ray beam Bx. However, with a grid 4 having a structure with an optical focal point, since z-movement of the X-ray tube 1 is not permitted, the object can be photographed using the grid 4 only when the X-ray focal point is located at the position of the focal length of the grid 4. This embodiment exemplifies a case wherein the grid 4 has no optical focal point. Even when the grid 4 has an optical focal point, the same technique can be applied to movements of the grid 4 in the x- and y-directions since only the z-position of the X-ray tube 1 is limited.

The grid 4 is driven in the x- and y-directions to track the irradiated region (Xb, Yb)×(Xu, Yu). When two read-out A/D converters are prepared for upper and lower systems, and the panel sensor 5 is moved in the y-direction by the panel sensor y-drive device 11, the grid 4 placed on the panel sensor 5 need only be controlled in the x-direction. As for the control in the x-direction, the central point of the grid 4 in the x-direction is obtained as a position on the panel sensor on the basis of the value of an x-encoder, and if Gx represents this central point, the moving amount of the grid 4 is 160 μm×{Gx−(Xb+Xu)/2}. This calculation and movement of the grid 4 are done only upon inputting an image in the averaging mode, and are completed before image capture in the next cut-out mode.

The phototimers 9 adhered to the grid 4 are used for photographing a portion of interest with a predetermined dose. In order to obtain an image with a high S/N ratio upon switching from fluoroscopic image observation to a still image mode, the X-ray dose must be increased in photographing. For this reason, the operator empirically predicts an appropriate dose before taking a photograph. However, if the phototimers 9 are used, photographing can be done with a more accurate dose.

Since a video fluoroscopy image has a small X-ray amount, the gain of the amplifier 15 before A/D conversion in the data read-out circuit is increased upon photographing. However, in case of a still image, the gain of the amplifier 15 is set in a normal mode to prevent A/D conversion from overflowing even upon reception of a large amount of X-rays. Normally, the position of each phototimer 9 cannot be observed as an X-ray image in a fluoroscopic image since its X-ray absorption amount is very small. However, in this embodiment, since the phototimers 9 are adhered to predetermined positions of the grid 4, shadows Q of the phototimers 9 can be displayed using the superimpose circuit 22 by a calculation in a phototimer pattern forming unit, as shown in FIG. 3. Note that the plurality of phototimers 9 can be individually enabled/disabled. Display of the shadows Q of the phototimer 9 can be turned on/off in accordance with an instruction from the OPU 29. Even when the display of the shadows Q of the phototimers 9 is turned off, each phototimer 9 can be enabled/disabled.

In this embodiment, the phototimers are fixed to the grid 4. Alternatively, the phototimers may be fixed to a support member different from the grid 4, and the support member may be moved upon movement of the irradiated region. In this case, the positions of the phototimers in the irradiated region can be accurately adjusted.

As for the visible light image region Av, since an optical system of the visible light television camera 6 has a zoom function, the field of view of the visible light television camera 6 is controlled using the camera angle drive device 7 so that the center of irradiation is located at the center of the visible light image irrespective of the moving position of the X-ray tube xyz-drive device 8. In this case, control in the x-direction is always guaranteed since the visible light television camera 6 is attached onto the X-ray tube 1. For this reason, upon superimposing the fluoroscopic image on the visible light television camera image, control in the y-direction is performed.

Figure 10:
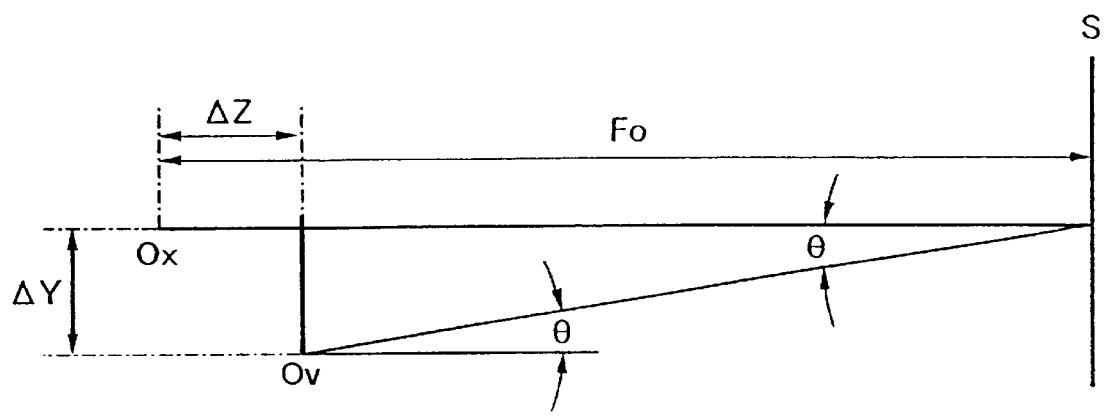
FIG. 10 is an explanatory view of panel sensor tracking.

Upon control in the y-direction, in order to locate the X-ray irradiated region Ax at nearly the center of the visible light irradiated region Av, the angle θ of the visible light television camera 6 must be controlled. As shown in FIG. 10, let Fo be the distance from an X-ray focal point Ox to the body axis of the object S, Ov be the focal point of the visible light television camera 6, and ΔZ and ΔY be shifts between the X-ray focal point Ox and a focal point Ov of the visible light television camera 6 in the two-dimensional directions. Then, the angle θ of the visible light television camera 6 is:

$$\theta = \tan^{-1}\{\Delta Y/(Fo-\Delta Z)\}$$

The relationship between the visible light image size Md×Nd and the fluoroscopic image size Ms×Ns to be displayed on the fluoroscopic image display unit 23 is calculated. Md and Nd are designed within the number of pixels to be displayed on the fluoroscopic image display unit 23. Since the visible light television camera 6 has an auto-focus function, physical sizes Md and Nd are respectively given by Hx(d/f−1) and Hy(d/f−1) on the basis of the focal length f of a lens system which is focused on the object, a focus distance d, and the sensor sizes Hz and Hy of the visible light television camera 6.

Note that slight errors are produced in the predicted value Fo of the distance from the X-ray focal point Ox to the body axis and the focus distance d. However, since Fo>(d+ΔZ) normally holds, a fluoroscopic image is displayed in a slightly larger size. Conversely, the distance Fd to the panel sensor 5 can be estimated using this focus distance d.

If the irradiated region extraction result falls within the range between (Xu, Yu) and (Xb, Yb), the number Ms of pixels of the fluoroscopic image in the x-direction on the fluoroscopic image display unit 23 and the number Ns of the pixels in the y-direction are determined based on the physical sizes Hx(d/f−1) and Hy(d/f−1), (Fo/Fd)×(Xb−Xu), and (Fo/Fd)×(Yb −Yu) by:

$$Ms=\{Md\cdot(Fd/Fd)\cdot(Xb-Xu)\}/\{Hx(d/f)/f\}$$

$$Ns=\{Nd\cdot(Fd/Fo)\cdot(Yb-Yu)\}/\{Hy(d/f)/f\}$$

When the visible light television camera 6 is zoomed without increasing the aperture area of the two-dimensional stop 2 by operation at the OPU 29, the numbers Ms and Ns of pixels increase from these equations, and the fluoroscopic image increases in size accordingly. This means that the enlargement/reduction factor of the image enlargement/reduction circuit 18 is controlled in the enlargement direction upon changes in the numbers Ms and Ns of pixels.

Finally, the still image mode will be explained. A still image is obtained in a video fluoroscopy mode, and also when the video fluoroscopy mode is not used. In case of the still image in the video fluoroscopy mode, since the irradiated region Ax is known in advance, only an image of that portion is acquired by the data read-out circuit 16, is transferred to the still image display unit 25 via the pre-processing circuit 17, the image enlargement/reduction circuit 18 set at equal magnification, and the bus line 20, and is displayed via the still image look-up table 24. This look-up table 24 is determined by an image analysis program on the basis of an image which is separately transferred to the main memory 27. On the other hand, if a still image is obtained when the video fluoroscopy mode is not used, since the irradiated region Ax is unknown, the aforementioned irradiated region extraction in the averaging mode is done. More specifically, the entire field of the panel sensor 5 is acquired, and is transferred to the main memory 27 via the pre-processing circuit 17 and the image enlargement/reduction circuit 18 set at equal magnification. After the region is extracted from a 336×336 reduced image, only the irradiated portion is transferred to and displayed by the still image display unit 25.

The look-up table 21 of the fluoroscopic image display unit 23 is calculated by image analysis on the basis of a 336×336 image obtained in the averaging mode. The image analysis normally uses histogram smoothing, and generates a look-up table 21 which makes the converted histogram flat with respect to density. Also, a region of interest may be extracted using anatomical division, and histogram smoothing may be done for that region. Furthermore, the image enlargement/reduction circuit 18 can use decimation or byperbolic reduction upon reduction, and linear interpolation or spline interpolation upon enlargement.

Figure 11:
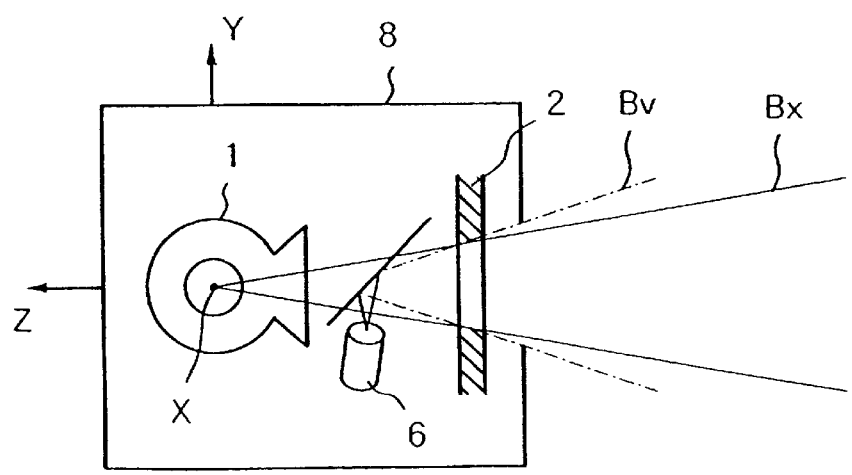
FIG. 11 is a sectional view of a light source unit according to the second embodiment of the present invention.

FIG. 11 shows the second embodiment. In this embodiment, the object S is irradiated with a light beam Bv coming from the visible light television camera 6 via the two-dimensional stop 2 for X-rays as in the X-ray beam Bx to photograph a visible image.

In this case, since the angle θ of the visible light television camera 6 is 0, the camera angle drive device 7 is not required. The focal point position of the visible light television camera 6 is located closer to the object S in the z-direction than the X-ray focal point position in relation to their conjugate points to set a broader field angle than X-rays. Other arrangements are nearly the same as in the first embodiment, and a detailed description thereof will be omitted.

To restate, the radiography apparatus of this embodiment extracts an image of the irradiated region from an image formed by the data read-out circuit 16, data acquisition unit 19, or panel sensor 5 on the basis of the irradiated region extraction result, and displays the extracted image in real time. For this reason, upon moving the irradiated region in the fluoroscopy mode using a large two-dimensional panel sensor, the need for moving the panel sensor can be obviated. Furthermore, since a high frame rate can be set, the apparatus of this embodiment is suitable for a moving image, and photographing can be simplified.

Also, since the radiography apparatus of this embodiment controls the line that divides the sensor surface of the panel sensor 5 in the y-direction, and the line that divides the extracted irradiated region in the y-direction to roughly overlap each other, the frame rate can be increased, and an X-ray fluoroscopic moving image can be improved. Since the control of the body axis of the object need only be mainly made, photographing can be simplified.

Furthermore, the radiography apparatus of this embodiment controls the relationship between the positions of a plurality of regions in the irradiated region and those of a plurality of regions on the panel sensor 5 on the basis of the detection result of the irradiated region upon parallelly reading out signals from the plurality of regions on the panel sensor 5, thus allowing photographing with improved frame rate.

Moreover, the radiography apparatus of this embodiment detects an image input range (irradiated region) and extracts and displays an image based on that detection result. Hence, an image can be captured at high speed, and the apparatus is suitable for displaying a moving image.

In addition, since the radiography apparatus of this embodiment simultaneously displays a radiographic image and visible image, the photographer can concentrate on monitoring of the displayed images, thus greatly improving operability. In particular, when the radiographic image is inserted (superimposed) and displayed at a corresponding position of the visible image, viewing by the operator can be made easier.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for radiographing an object, comprising:
a radiation generating unit which includes a radiation source for generating radiation;
a two-dimensional sensor configured to receive the radiation and convert the received radiation into radiographic image data;
an acquisition unit configured to acquire image data from said two-dimensional sensor;
a specifying unit configured to specify an irradiated region which is a region on said two-dimensional sensor irradiated with radiation; and
a control unit configured to control said acquisition unit and said specifying unit,
wherein said control unit is operable in a first mode in which said specifying unit is activated to specify the irradiated region, and in a second mode in which said acquisition unit is controlled to read image data only from a partial region of said two-dimensional sensor, which partial region is determined based on the irradiated region specified in the first mode, and said control unit switches the first mode and the second mode mutually at a predetermined timing.

2. The apparatus according to claim 1, further comprising:
a source moving unit configured to move the radiation source.

3. The apparatus according to claim 1, further comprising:
a grid which removes scattered radiation coming from the object; and
a grid moving unit configured to move said grid so as to track the irradiated region.

4. The apparatus according to claim 3, further comprising a phototimer which detects radiation dosage, said phototimer being fixed to said grid.

5. The apparatus according to claim 1, further comprising:
a phototimer which detects a radiation dosage; and
a phototimer moving unit configured to move said phototimer so as to track the irradiated region.

6. The apparatus according to claim 1, wherein the radiographic image data is read out in parallel from a plurality of regions of said two-dimensional sensor, the apparatus further comprising a sensor moving unit configured to move said two-dimensional sensor based on the irradiated region.

7. The apparatus according to claim 6, wherein said sensor moving unit moves said two-dimensional sensor so as to locate the irradiated region substantially evenly on the plurality of regions of said two-dimensional sensor.

8. The apparatus according to claim 6, further comprising:
a source moving unit configured to move, in a system in which a perpendicular dropped from the radiation source to said two-dimensional sensor is defined as a Z-axis, and X- and Y-axes perpendicular to the Z-axis and each other are defined, the radiation source at least in the Y-axis direction,
wherein the plurality of regions of said two-dimensional sensor are two regions divided in the Y-axis direction by a first dividing line, and
wherein said sensor moving unit is adapted to obtain a second dividing line that divides said irradiated region in the Y-axis direction, and move said two-dimensional sensor in the Y-axis direction so as to make the first and second dividing lines substantially overlap each other.

9. The apparatus according to claim 1, wherein said specifying unit specifies the irradiated region based on an aperture area of a two-dimensional stop included in said radiation generating unit.

10. The apparatus according to claim 1, wherein, in the first mode, said control unit controls said acquisition unit to read image data from a whole area of said two-dimensional sensor and controls said specifying unit to specify the irradiated region based on said acquired image data, and in the second mode, said control unit controls said acquisition unit to read image data only from the partial region determined based on the irradiated region specified in the first mode.

11. The apparatus according to claim 9, wherein, in the first mode, said specifying unit reduces the image data in image size, and specifies the irradiated region based on the reduced image data.

12. A method of radiographing an object using a two-dimensional sensor adapted for converting a radiation image into radiographic image data, comprising steps of:

acquiring image data from the two-dimensional sensor;

specifying an irradiated region of the radiation on the two-dimensional sensor; and controlling the execution of the acquisition step and the specifying step, wherein the control step operates in a first mode in which the specifying step is activated to specify the irradiated region, and in a second mode in which the acquisition step is controlled to read image data only from a partial region of the two-dimensional sensor, which is determined based on the irradiated region specified in the first mode, and said control step switches the execution of the first mode and the second mode mutually at a predetermined timing.

13. A storage medium storing a program for causing a computer to execute a process according to a method of radiographing an object using a two-dimensional sensor adapted to convert a radiation image into radiographic image data, the method comprising steps of:

acquiring image data from the two-dimensional sensor;

specifying an irradiated region of the radiation on the two-dimensional sensor; and controlling the execution of the acquisition step and the specifying step, wherein the control step operates in a first mode in which the specifying step is activated to specify the irradiated region, and in a second mode in which the acquisition step is controlled to read image data only from a partial region of the two-dimensional sensor, which is determined based on the irradiated region specified in the first mode, and said control step switches the execution of the first mode and the second mode mutually at a predetermined timing.

* * * * *

UNITED STATES PATENT AND TRADEMARK OFFICE
CERTIFICATE OF CORRECTION

PATENT NO. : 6,731,783 B2
DATED : May 4, 2004
INVENTOR(S) : Osamu Tsujii

It is certified that error appears in the above-identified patent and that said Letters Patent is hereby corrected as shown below:

Title page,
Item [56], References Cited, FOREIGN PATENT DOCUMENTS, OTHER PUBLICATIONS
"CCD Mosaic Technique for Large Field Digital Mammography, by Antony jalink, IEEE, all Pages.*
CCD Mosaic Technique for Large Field Digital Mammography, by Antony jalink, IEEE, all Pages,1996.*" should be deleted.

Column 3,
Line 55, "upward arrow T" should read -- upward arrow ↑ --

Column 6,
Line 5, "(Xb-)/(Yb-Yu)." should read -- (Xb-Xu)/(Yb-Yu). --.

Column 8,
Line 23, "(Fd/Fd)" should read -- (Fd/Fo) --.

Column 11,
Line 1, "claim 9," should read -- claim 10, --.

Signed and Sealed this

Twenty-sixth Day of April, 2005

JON W. DUDAS
*Director of the United States Patent and Trademark Office*